(12) United States Patent
Ali et al.

(10) Patent No.: US 6,672,001 B1
(45) Date of Patent: Jan. 6, 2004

(54) METHOD FOR MULCHING AN AGRICULTURAL SOIL BED USING A BIODEGRADABLE PROTEIN MATERIAL, AND A MULCHED AGRICULTURAL CROP GROWING PLOT PRODUCED THEREBY

(75) Inventors: Yusuf Ali, Flint, MI (US); Viswas Ghorpade, Newport, KY (US); Robert Weber, Aurora, NE (US); Milford Hanna, Lincoln, NE (US)

(73) Assignee: Board of Regents of University of Nebraska, Lincoln, NE (US)

( * ) Notice: Subject to any disclaimer, the term of this patent is extended or adjusted under 35 U.S.C. 154(b) by 0 days.

(21) Appl. No.: 09/193,559

(22) Filed: Nov. 17, 1998

(51) Int. Cl.$^7$ .............................................. C09K 17/52
(52) U.S. Cl. .......................................................... 47/9
(58) Field of Search ................................... 47/9, 58.1 R

(56) References Cited

U.S. PATENT DOCUMENTS

| | | | | |
|---|---|---|---|---|
| 2,793,960 A | * | 5/1957 | van Bavel | 47/58.1 |
| 3,640,021 A | * | 2/1972 | Grafmuller | 47/9 |
| 4,107,112 A | * | 8/1978 | Latta, Jr. et al. | 260/18 EP |
| 5,360,892 A | * | 11/1994 | Bonsignore et al. | 528/354 |
| 5,451,673 A | * | 9/1995 | Fishman et al. | 536/123 |
| 5,536,807 A | * | 7/1996 | Gruber et al. | 528/354 |
| 5,658,486 A | * | 8/1997 | Rogers et al. | 252/88.1 |
| 5,741,521 A | * | 4/1998 | Knight et al. | 424/488 |
| 5,783,504 A | * | 7/1998 | Ehret et al. | 442/395 |
| 6,122,860 A | * | 9/2000 | Von Tapavicza et al. | 47/58.1 |
| 2002/0129544 A1 | * | 9/2002 | Bargiacchi et al. | 47/9 |

FOREIGN PATENT DOCUMENTS

| | | | |
|---|---|---|---|
| DE | 19735308 A1 | * | 2/1999 |
| JP | 11075578 A | * | 3/1999 |

OTHER PUBLICATIONS

Examiner's A, Ghorpade, V.M and C.L. Weller,Nonedible wheat gluten films for use as mulch and bags, Aug. 1997, USDA, pp. 1–2.*
Examiner's B, 1996 Faculty Dep't of Biological Systems Engineering, 1996, p. 7, bottom.*
Examiner's C, Jane, Jay–lin, ISU studies soy–protein films to reduce plastic pollution, Jun. 1996, p. 1.*
A. Gennadios et al., "Mechanical and Barrier Properties of Egg Albumen Films," *J. Food Sci.*, vol. 61, No. 3, 1996, pp. 585–589.
T.P. Aydt et al., "Mechanical and Barrier Properties of Edible Corn and Wheat Protein Films," *Transaction of the ASAE*, vol. 34, No. 1, 1991, pp. 207–211.
A.H. Brandenburg et al, "Edible Films and Coatings from Soy Protein," *J. Food Sci.*, vol. 58, No. 5, 1993, pp. 1086–1089.
Aristippos Gennadios and Curtis L. Weller, "Edible Films and Coatings from Wheat and Corn Proteins," *Food Technology*, vol. 44, No. 10, Oct. 1990, pp. 63–69.

A. Gennadios and C.L. Weller, "Edible Films and Coatings from Soymilk and Soy Protein," *Cereal Foods World*, vol. 36, No. 12, Dec. 1991, pp. 1004–1009.
Aristippos Gennadios et al., "Effect of pH on Properties of Wheat Gluten and Soy Protein Isolate Films," *J. Agric. Food Chem.*, vol. 41, No. 11, 1993, pp. 1835–1839.
Aristippos Gennadios et al., "Water Vapor Permeability of Wheat Gluten and Soy Protein isolate Films," *Industrial Crops and Products*, vol. 2, 1994, pp. 189–195.
A. Gennadios et al., "Relative Humidity and Temperature Effects on Tensile Strength of Edible protein and Cellulose Ether Films," *Transactions of the ASAE*, vol. 36, No. 6, Nov./Dec. 1993, pp. 1867–1872.
A. Gennadios et al., "Temperature Effect on Oxygen Permeability of Edible Protein–Based Films,"*J. Food. Sci.*, vol. 58, No. 1, 1993, pp. 212–214, and 219.
A Gennadios et al., "Property Modification of Edible Wheat, Gluten–Based Films," *Transactions of the ASAE*, vol. 36, No. 2, Mar./Apr. 1993, pp., 465–470.
Aristippos Gennadios et al., "Modification of Physical and Barrier Properties of Edible Wheat Gluten–Based Films," *Cereal Chemistry*, vol. 70, No. 4, 1993, pp. 426–429.
Aristippos Gennadios et al., "Measurement Errors in Water Vapor Permeability of Highly Permeable, Hydrophilic Edible Films," *Journal of Food Engineering*, vol. 21, 1994, pp. 395–409.
V.M. Ghorpade et al., "Soy Protein Isolate/Poly(ethylene Oxide) Films,"*Cereal Chemistry*, vol. 72, No. 6, 1995, pp. 559–563.
V.M. Chorpade et al., "Chemically Modified Soy Protein Films," *Transactions of the ASAE*, vol. 38, No. 6, 1995, pp. 1805–1808.
V.M. Ghorpade and M.A. Hanna, "Mechanical Properties of Soy Protein–Polyethylene Ribbon and Film Extrudates," *Transactions of the ASAE*, vol. 39, No. 2, 1996, pp. 611–615.
V. Ghorpade et al., "Properties of Polylactic Acid–Coated Wheat Gluten Films," *Proceedings of the 6th International Gluten Workshop* Sep. 1996, pp. 432–438.

* cited by examiner

*Primary Examiner*—Peter M. Poon
*Assistant Examiner*—Jeffrey L. Gellner
(74) *Attorney, Agent, or Firm*—Shook, Hardy & Bacon LLP

(57) ABSTRACT

A method is provided for mulching an agricultural soil bed using a biodegradable protein mulch material. The method includes the preparation of a film forming solution of a film forming protein material. The film forming protein solution is then sprayed directly onto a surface of an agricultural soil bed. The solution dries to form a thin film of protein material on the surface of the agricultural soil bed. The protein material may comprise a plant protein, a milk protein, an animal protein, a whey protein, casein, an egg protein or gelatin. Following a harvest, the mulch material, which is biodegradable, may simply be plowed under.

2 Claims, No Drawings

METHOD FOR MULCHING AN AGRICULTURAL SOIL BED USING A BIODEGRADABLE PROTEIN MATERIAL, AND A MULCHED AGRICULTURAL CROP GROWING PLOT PRODUCED THEREBY

BACKGROUND OF THE INVENTION

1. Field of the Invention

The present invention relates to the field of agriculture, and in particular to the mulching of agriculture soil beds using a thin protein film as a mulch layer. More particularly the invention relates to the mulching of agricultural crop growing plots by spreading a protein solution thereon and allowing the solution to dry to form a thin mulching film of protein lying over the plot.

2. Prior Activities and Problems in the Field

Mulch is defined as a protective covering used on the ground generally over a growing crop to reduce evaporation, prevent erosion, control weeds, and/or enrich the soil. There are many kinds of materials that may be used for mulching, for example, compost, sheet composting, humus, organic mulches, seed free mulches, green growing mulches, etc. Compost, humus and organic matter mulches are generally used in small gardens and fields having small cropping areas. Polyethylene mulch is a material most commonly used on farms at the present time to conserve soil moisture, prevent soil erosion, modify soil temperature, and control weeds, with resulting improvements in yield, quality, earliness of harvest, and efficiency of management.

An undesirable consequence of using a conventional polyethylene mulch, however, is that polyethylene does not readily decompose in nature. This creates additional operations for the producer to pick up the mulch and dispose of it. Unfortunately, it has been observed that non-biodegradable mulches, such as polyethylene film, are often disposed of by burning, by being pushed aside or by dumping in a landfill. These disposal methods either give off harmful fumes or create more waste in the environment.

During the last several decades, tremendous strides have been made to enhance the usefulness of artificial mulches. This is due to the development of new and improved materials and new and improved techniques and machinery with which to perform the necessary operations. Mulches consisting of styrene-butadiene polymer dispersions have been developed. Such mulches may be sprayed on soil and dried to a film. Moreover these mulches provide many of the desirable effects of a plastic mulch, and yet the material is biodegradable such that it can be plowed under following harvest. No mulch waste is produced that needs collecting and disposing of away from the field.

Development of biopolymer films and coatings from proteins, polysaccharides and lipid materials have received increased interest in recent years. In the midst of rising concerns over environmental protection, the renewable nature of biopolymer film ingredients renders such films particularly appealing for innovative uses in the field as mulch. Furthermore, since many of these film-forming biopolymers are edible, it is obvious that a biodegradable mulch may be readily prepared therefrom. Films prepared from proteins such as wheat gluten, corn zein, soy proteins, peanut proteins, milk proteins, collagen and gelatin have been developed and tested for selected physical and mechanical properties. Recent studies have concentrated on the development and property evaluation of films made from soy protein isolate and wheat gluten.

Ongoing research projects at the Industrial Agricultural Products Center (IAPC) of the University of Nebraska involve modification of biopolymers for incorporation into plastic films. Recent publications authored by researchers working at IAPC provide an up-to-date review of research on edible films and coatings produced from grain proteins. Both publications are extensive reviews and interested readers are referred to Gennadios, A, and C. L. Weller (1990) "Edible Films and Coatings From Wheat and Corn Proteins", *Food Technology* 44(10): 63–69; and Gennadios, A. and C. L. Weller (1991), "Edible Films and Coatings From Soybeans and Soy Protein", *Cereal Foods World* 36(12):1004–1009.

Comprehensive reviews on the film-forming properties of several protein, polysaccharide, and lipid substances have recently been published. (See Guilbert, S. (1986), "Technology and Application of Edible Protective Films", *Food Packaging and Preservation: Theory and Practice*, ed. M. Mathlouthi, 371–394, Elsevier Applied Science Publishers, Ltd. (London); Guilbert, S. (1988), "Use of Superficial Edible Layer to Protect Intermediate Moisture Foods: Application to the Protection of Tropical Fruits Dehydrated by Osmosis, *Food Preservation by Moisture Control*, ed. C. C. Seow, 199–-219, Elsevier Applied Science Publishers, Ltd. (London); Kester, J. J. and O. R. Fennema (1986), "Edible Films and Coatings: A Review", *Food Technology* 40(12), 47–59; and Krochta, J. M. (1992), "Control of Mass Transfer in Foods with Edible Coatings and Films", *Advances in Food Engineering*, ed. R. P. Singh and M. A. Wirakartakusumah, 517–538, CRC Press, Inc. (Boca Raton, Fla.)). Protein films in particular have also been discussed in detail by Gennadios and others (See A. Gennadios, T. H. McHugh, C. L. Weller and J. M. Krochta (1993), "Edible Coatings and Films Based on Proteins", *Edible Coatings and Films to Improve Food Quality*, ed. J. M. Krochta, M. Nisperos-Carriedo and E. A. Baldwin (In press), Technomic Publishing Company, Inc. (Lancaster, Pa.); A. Gennadios, A. H. Brandenburg, C. L. Weller and R. F. Testin, (1993), "Effect of pH on Properties of Wheat Gluten and Soy Protein Isolate Films", *Journal of Agricultural and Food Chemistry* 41:1835 –1839; A. Gennadios, A. H. Brandenburg, A. H. Park, C. L. Weller and R. F. Testin (1993), "Water Vapor Permeability of Wheat Gluten and Soy Protein Isolate Films", *Industrial Crops Products* (In press); A. Gennadios, H. J. Park and C. L. Weller (1993), "Relative Humidity and Temperature Effects on Tensile Strength of Edible Protein and Cellulose Ether Films", *Transactions of the ASAE* (In press); A. Gennadios, C. L. Weller and R. F. Testin (1993), "Temperature Effect on Oxygen Permeability of Edible Protein-Based Films", *Journal of Food Science* 58:212–214, 219; A. Gennadios, C. L. Weller and R. F. Testin (1993), "Modification of Properties of Edible Wheat Gluten-Based Films", *Transactions of the ASAE* 36: 465–470; A. Gennadios, C. L. Weller and R. F. Testin (1993), "Modification of Physical and Barrier Properties of Edible Wheat Gluten-Based Films", *Cereal Chemistry* 70:426–429; A. Gennadios, C. L. Weller and C. H. Gooding (1993), "Measurement errors in Water Vapor Permeability of Highly Permeable, Hydrophilic Edible Films", *Journal of Food Engineering* (In press); A. Gennadios, C. L. Weller, M. A. Hanna and G. W. Froning (1993), "Edible Films from Egg White Protein", ASAE Paper No. 93–6037, ASAE (St. Joseph, Mich.)). Current Industrial applications of protein films include sausage casings from collagen (Hood, L. L. (1987), "Collagen in Sausage Casings", *Advances in Meat Research* 4:109–129); protective coatings of corn zein, usually mixed with acetylated monoglycerides, for use on nutmeats, medicinal tablets, and candy (Reiners, R. A., J. S. Wall and G. E. Inglett (1973), "Corn Proteins: Potential for their Industrial Use", *Industrial Uses of Cereals*, ed. Y. Pomeranz, 285–302, American Association of Cereal Chemists (St. Paul, Minn.); Andres, C. (1984), "Natural Edible Coating Has Excellent Moisture and Grease Barrier Properties", *Food Processing* 45(13): 48–49); and gelatin pharmaceutical capsules (Rose, P. I. (1987), "Gelatin", *Encyclopedia of polymer Science and Engineering*, ed. H. F. Mark, N. M. Bikales, C. G., Overberger and G. Menges, Vol. 7: 488–513, John Wiley & Sons, Inc.(New York)).

Considerable work is ongoing by various researchers related to edible films and coatings. Examples of some of these workers and their interests include: Krochta at UC-Davis-milk protein films (Ho, B. P., R. Avena-Bustillos and J. M. Krochta (1991), "Water Vapor Permeability of CaseIn-Based Edible Films", Presented at AIChE Conference of Food Engineering (Chicago, Ill.); Fennema at Wisconsin—multi component films from cellulose and lipids (Greener, I. K. and O. Fennema (1989), "Barrier Properties and Surface Characteristics of Edible Bilayer Films", *J Food Sci.* 54(6): 1393–1399); Labuza at Minnesota—various film types (Koelsch, C. M. and T. P. Labuza (1991), "Structural, Thermal and Functional Properties of Edible Fatty Acid Based Films", Presented at IFT Annual Meeting (Dallas, Tex.); Guilbert at the Centre d'Etudes et d'Expérimentation en Mécanisation Agricole et Technologie alimentaire in France (Gontard, N., S. Guilbert and J-L. Cuq (1993), "Water and Glycerol as Plasticizer Affect Mechanical and Water Vapor Barrier Properties of an Edible Wheat Gluten Film", *Journal of Food Science* 58: 206–211); Torres at Oregon State—cellulosic and lipid films (Anonymous (1991), "No More Soggy Ice Cream Cones", *Dairy Herd Management* 2:13.); Nisperos-Carriedo and associates at the USDA-ARS Citrus and Subtropical Products Research Lab—cellulosic, shellac, and lipid films and coatings (Sanchez, D (1990), "Keep in Under an Edible Coat", *Agricultural Research* 38(3):4–5; Hagenmaier, R. D. and P. E. Shaw (1990), "Moisture Permeability of Edible Films Made with Fatty Acid and (Hydroxypropyl) Methylcellulose, *J. Agric. Food Chern.* 38:1799–1803); Wong, et al, at the USDA-ARS Western Regional Lab—chitin coatings (Webb, T. (1991), "End is in Sight for the Soggy Jelly Sandwich", *Anderson Independent-Mall* (Anderson, S. C.)); Narayan at the Michigan Biotechnology Institute—corn zein on paper (Rice, J. (1991), "Biogradable Plastics—Do They Have A Viable Future for Food Packaging Applications?", *Food Processing* 52(11):34–35,38,40); Chinnan at Georgia—cellulosic and corn protein films and coatings (Park, H. J. and M. S. Chinnan (1990), "Properties of Edible Coatings for Fruits and Vegetables", ASAE Paper No. 90–6510, ASAE (St. Joseph, Mich.)); Herald at Kansas State—wheat gluten films (Personal communication), and Baianu at Illinois—various film types (Ozu, E. M., H. Y. Kim and I. C. Baianu(1991), "Development of Edible Films from Polysaccharides, Starch and Corn Proteins", Presented at IFT Annual Meeting (Dallas, Tex.)).

Workers at IAPC have developed procedures to allow for the production of homogeneous corn, wheat and soy protein films. Several different formulations for use in formation of wheat gluten films have been studied. The formulations differ in the type and amount of plasticizer added to the film mixture. Efforts in enhancement include soaking the films in buffer, salt, or tanning solutions; or supplementing the film formula with other substances such as keratin and/or surfactants. Evaluation of the barrier and mechanical properties of these latest films show that incorporation of additives, modification of film-forming solutions, and soaking treatments all improve the films to some extent. However, an order of magnitude improvement is desirable for increasing the commercial exploitability of the films. Further improvement of film properties, especially to increase moisture barrier ability, presents a challenge. Tailoring of protein films to specific applications often requires a thorough evaluation of the properties of the film. Several studies have reported property characteristics of protein films from wheat gluten, corn zein, soy protein, caseiso and egg albunin. (In addition to the references cited above, also see T. P. Aydt, C. L. Weller, and R. F. Testin (1991), "Mechanical and Barrier Properties of Edible Corn and Wheat Protein Films", *Transactions of the ASAE* 34(1):207–211; N. Gontard, S. Guilbert and J-L. Cuq (1992), "Edible Wheat Gluten Films: Influence of the Main Process Variables on Film Properties Using Response Surface Methodology", *Journal of Food Science* 57: 190–195, 199; A. H. Brandenburg, C. L. Weller and R. F. Testin (1993), "Edible Films and Coatings From Soy Protein" *Journal of Food Science* 58:1086–1089; and T. H. McHugh, R. Avena-Bustillos and J. M. Krochta (1993), "Hydrophillo Edible Films: Modified Procedure for Water Vapor Permeability and Explanation of Thickness Effects", *Journal of Food Science* 58:899–903).

Efforts to improve water barrier properties begin with the understanding that films of proteinaceous material may be formed due to the presence of side groups on many amino acids. These groups function easily to form hydrogen bonds, ionic bonds and even covalent bonds between molecular chains. There are many reactive sites available on protein polymeric chains, and wheat protein will form crosslinks by hydrophobic interactions due to the large number of hydrophobic amino acid sites. Efforts to decrease the hydrophillic nature of wheat protein films have focussed on two important insolubilization mechanisms. The first mechanism involves a reaction with hydrophilic groups on the protein polymers to block them thereby causing them to have a reduced affinity for water. The second mechanism involves a crosslinking reaction between adjacent molecules to thereby form a reinforced structure rigid enough to resist swelling when wetted. Resinous material, such as polyethylene, is most effective for this purpose. Groups on protein polymers, such as—$NH_2$,—SH,—OH,—COOH and=NH, may contribute to the crosslinking reaction through the use of various catalytic and other agents. These functional groups on the amino acids can be crosslinked or grafted onto polyethylene. The side chains of threonine and serine specifically may be attached chemically to remove $H_2O$ molecules and create a —C=C—group which is quite active in graft copolymerization with polyethylene.

Grafting acrylates and vinyl chain polymers onto proteins using the ceric ion method has been well documented. Ceric ion forms an effective redox system in the presence of organic reducing agents such as alcohols, glycols, aldehydes, acetals, thiols, esters and carboxylic acids. Ceric ammonium nitrate has been used as an initiator by Rao and co-workers (K. P. Rao, K. T. Joseph, and Y. Nayudamma (1972), "Characterization of the Collagen-Vinyl Graft Copolymers Prepared by the Ceric Ion Method", II Infrared spectra and electron microscopy 16: 975–986) to graft methyl methacrylate acrylonitrile and acrylamide to collagen. Mino and Kaizeman (G. Mino and S. Kalzerman (1958), J. Polym. Sci. 31:242) showed that alcohols form a ceric ion alcohol complex and that the dissociation of this complex is a rate limiting step. Since wheat gluten contains alcoholic groups and several amino acids, grafting monomers can be successfully performed by the ceric ion method.

Graft polymerization reactions may also be carried out with other active groups of wheat gluten.

Plastic mulches have been used for several decades, but very limited research has been reported on the use of environmentally friendly biodegradable materials as mulches. Brown et al. (1992), in the department of Horticulture at Auburn University, used a blue-black styrofan at a rate of 959 L/ha in a pepper field and reported that yields were similar for the styrofan and plastic mulch treatments. These investigators suggested that styrofan could be used as an alternative for conventional black polyethylene mulch. The cost of styrofan application is high. However, savings on investment and labor costs could result because styrofan is biodegradable and does not require additional equipment and labor for removal from field.

SUMMARY OF THE INVENTION

It is a primary objective of the present invention to provide a method for mulching an agricultural soil bed using a thin protein film. In accordance with the method a film forming solution of a film forming protein material is prepared. A quantity of the protein solution is then spread directly over a surface of an agricultural soil bed. The quantity preferably is sufficient to provide a thin mulching film of the protein material on the surface of the agricultural soil bed after the solution has dried. The protein solution on the surface may then be allowed to dry to thereby form a thin film of protein material on the surface.

In one preferred form of the invention, the film forming protein solution may comprise an aqueous solution of soy protein isolate. In a particularly preferred form of the invention the protein solution may be alkaline and may comprise from about 2 to about 10% by weight glycerine and from about 5 to about 15% by weight of the protein isolate.

In another preferred form of the invention, the film forming protein solution may comprise an aqueous solution of wheat gluten. In a particularly preferred form of this aspect of the invention, the solution may be alkaline and may comprise from about 2 to about 10% by weight glycerine, from about 35 to about 70% by weight ethanol, from about 35 to about 70% by weight water and from about 2 to about 15% by weight of the wheat gluten.

In accordance with the invention, the protein material used to form the thin film of protein material may comprise one or more of a plant protein, a milk protein, an animal protein, a whey protein, casein, an egg protein and a gelatin.

Generally speaking the film forming solution may be an alkaline aqueous solution, a soy bean protein isolate solution may comprise from about 8 to about 12 weight % solids and a wheat gluten solution may comprise from about 4 to about 6 weight % solids.

A sufficient amount of the soy bean protein isolate solution may be spread uniformly over the surface of an agricultural soil bed to provide a film of soy bean protein isolate material weighing from about 175 to about 225 pounds per acre on the surface of the plot after the solution has dried. Similarly, a sufficient amount of the wheat gluten protein solution may be spread over the surface of the agricultural plot to provide a film of wheat gluten protein material weighing from about 75 to about 125 pounds per acre on the surface of the plot after the solution has dried.

In accordance with another form of the invention, a method for producing an agricultural crop product is provided. This method comprises planting a potential agricultural product in a soil bed, spreading a quantity of a film forming solution of a film forming protein material directly over a surface of the planted soil bed, and allowing the protein solution on the surface to dry whereby to form a thin mulching film of protein material on the surface. Suffice it to say that in accordance with this form of the invention, the quantity of film forming solution spread on the surface of the planted soil bed should be sufficient to provide a thin mulching film of the protein material on the surface after the solution has dried.

In another form of the invention, an agricultural crop growing plot is provided. The agricultural crop growing plot may comprise a bed of soil and a planted potential agricultural product in the soil bed. In accordance with the invention, the agricultural crop growing plot also includes a thin film of protein material mulch on a surface of the soil bed over the product. The film may be formed by spreading a quantity of a film forming solution of a film forming protein material directly over the surface of the planted soil bed and allowing the protein solution on the surface to dry.

DETAILED DESCRIPTION OF PREFERRED EMBODIMENTS OF THE INVENTION

In accordance with the present invention, protein films may be used as agricultural mulches. Alkaline solutions of plant and animal proteins form films when cast and dried. Plasticizers such as glycerine may be employed as active ingredients to overcome brittleness of the protein film. In accordance with a preferred aspect of the invention, film forming protein solutions may be sprayed directly onto the soil surface to form a thin layer of film, which will then act as mulch to prevent moisture loss and provide weed control. Encapsulation of pesticides and herbicides into such films may have added advantages in controlled release applications.

Standard film forming solutions of soy and wheat proteins may be prepared and spread onto plots using a hand held sprayer. The solutions should be spread uniformly and so as to form a thin film. The dried film may hold a mass of soil together by forming a thin crust thereon. In a field experiment, annual rye grass seed was planted, and a known amount of film forming solution was sprayed thereon. Initial observations showed inhibition of weeds 3–4 weeks after planting. Additional observations indicate that even after a 6 inch rainfall the spray mulched plot maintained a coarse texture, suggesting that the protein film provides erosion control.

Successful implementation of biodegradable mulch technology should reduce the problems inherent in disposal of polyethylene film by replacing such film with an environmentally friendly biodegradable protein film. Approximately 180 million pounds of polyethylene film are used annually in connection with agricultural mulch applications. Assuming the direct materials cost of the film is 40% of its selling price, this amounts to an annual cost of $ 31.7 million. Moreover, direct cost of labor for mulch application and removal is estimated to be $ 30–40 per acre. After the cropping season is over, about 0.2 million cubic yards of plastic becomes landfill at a direct cost of $ 2.25 million annually to American farmers. The invention on the other hand, enables savings on equipment investment and on the labor required for removal of plastic film from the field. In this latter regard it is to be noted that protein mulches are derived from renewable and natural sources which are fully degradable. Thus, the protein films may be tilled into the soil following the cropping season. Upon degradation (3–6 weeks), mulches will serve as a nutrient source for the next crop.

SPRAY MULCH EXAMPLES

The soy protein isolate (SPI) used in the following examples was procured from Archer Daniels Midland Co. (Decatur, Ill.). The wheat gluten was procured from Ogilvie Mills Ltd. (Quebec, Canada). All other chemicals were procured from Sigma Chemical Co. (St. Louis, Mo.).

Film Spray Solution Preparation

Soy Protein Isolate Film Solution

1. A water bath is preheated to 70° C.
2. Glycerine is added at a rate of about 3g to 100 ml of distilled water at room temperature.
3. About 1 ml of 10% NaOH is added to the water and glycerine solution and the latter is stirred at room temperature.
4. 10 g of SPI is gradually added while stirring to avoid lump formation. A drop or two of 10% NaOH may be added to the solution from time to time as the SPI is added.
5. As soon as all of the SPI has been added, the pH of the solution is adjusted to about 10–11 with 10% NaOH.
6. The solution is incubated in a beaker in a 70° C. water bath for about 30 min, and then the solution is cooled to room temperature.
7. The resulted solution may then be filtered through cheese cloth to remove any remaining lumps.

Wheat Gluten Film Solution 1. 3.36 g of glycerine is added to 48 ml of ethanol in a beaker at room temperature.
2. 10 g of wheat gluten is mixed into the ethanol-glycerine mixture at a rate of 2 g per min, and the mixture is stirred at room temperature.
3. After all of the wheat gluten has been mixed into the solution, 32 ml of distilled water and 8 ml of $NH_3OH$ may be poured simultaneously from respective different containers into the mixture of wheat gluten, ethanol and glycerine. The mixture may then be heated at a rate of 5° C./min until a temperature of 70° C. is achieved.
4. The beaker may then be removed from the heater and the sample may be filtered through cheese cloth.

Film solutions for forming protein mulch films may be similarly prepared from milk proteins, animal proteins, whey proteins, casein, egg proteins, and/or gelatin, and these films should behave similarly to the mulches derived from plant proteins. The solutions may be sprayed onto soil plots using a hand held spraying system.

Field plots for evaluating mulches were selected at the University of Nebraska-Lincoln. The soil texture of each selected site was a silt to clay loam soil. All plots were uniformly irrigated using surface irrigation for 24 hours prior to applying the mulch solution. Initial moisture content of the soil at depths of 0 (the surface), 12.5, and 25 cm were determined prior to the application of the mulch. A known amount of annual rye grass seed was broadcast onto each experimental plot and the seed was covered with soil. A protein spray mulch solution was sprayed on to each plot at an application rate specified hereinafter and allowed to dry. The soy protein isolate film solution with a solids content of about 10% was sprayed evenly over the soil bed at a rate of 2240 kg/hectare (2000 lbs/acre). The wheat gluten film solution with a solids content of about 5% was sprayed evenly over the soil bed at a rate of 2240 kg/hectare (2000 lbs/acre).

Performance of each type of mulch was evaluated with respect to its ability to inhibit weed growth and retain soil moisture. The experiment lasted 6 weeks. Soil moisture content at depths of 0 (the surface), 12.5, and 25 cm were determined every week.

ECONOMIC CONSIDERATIONS

At present, a polyethylene film mulch is less expensive than a protein film mulch. Moreover, polyethylene is readily available and a multi-billion dollar infrastructure is already in place to produce polyethylene. However, as environmental awareness grows around the world, opportunities to develop new markets for innovative technologies and products are created. Soy protein and wheat gluten, both produced in abundance in the U.S., are renewable and biodegradable products. When such proteins are used as mulch, American agriculture will save the direct and indirect costs involved in applying and removal of non-biodegradable plastic materials. Simple farm level processing of protein mulch materials clearly will reduce environmental pollution concerns as well as the load on landfills.

We claim:

1. A method for mulching an agricultural soil bed comprising:

preparing an alkaline aqueous film forming solution of a soy protein isolate material, said solution comprising from about 2 to about 10 percent by weight glycerine and from about 5 to about 15 percent by weight of said soy protein isolate material, spreading a quantity of said solution directly over a surface of an agricultural soil bed, said quantity being sufficient to provide a thin mulching film of said soy protein isolate material on said surface after the solution has dried; and allowing said solution on said surface to dry whereby to form said thin film of soy protein isolate material on said surface.

2. A method for mulching an agricultural soil bed comprising:

preparing an alkaline aqueous film forming solution of a wheat gluten material, said solution comprising from about 2 to about 10 percent by weight glycerine, from about 35 to about 70 percent by weight ethanol, from about 35 to about 70 percent by weight water and from about 2 to about 15 percent by weight of said wheat gluten material:

spreading a quantity of said solution directly over a surface of an agricultural soil bed, said quantity being sufficient to provide a thin mulching film of said wheat gluten material on said surface after the solution has dried: and allowing said solution on said surface to dry whereby to form said thin film of wheat gluten material on said surface.

* * * * *